(12) United States Patent
Ishizaki et al.

(10) Patent No.: US 12,128,562 B2
(45) Date of Patent: Oct. 29, 2024

(54) TOUCH SENSATION SENSOR, SENSITIVITY SWITCHING CIRCUIT, AND SENSITIVITY SWITCHING METHOD

(71) Applicant: Honda Motor Co., Ltd., Tokyo (JP)

(72) Inventors: Ryusuke Ishizaki, Saitama (JP); Takahide Yoshiike, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 412 days.

(21) Appl. No.: 17/583,113

(22) Filed: Jan. 24, 2022

(65) Prior Publication Data
US 2022/0314438 A1 Oct. 6, 2022

(30) Foreign Application Priority Data
Mar. 31, 2021 (JP) .................... 2021-061187

(51) Int. Cl.
| | | |
|---|---|---|
| *B25J 9/16* | (2006.01) | |
| *B25J 13/08* | (2006.01) | |
| *G01G 19/00* | (2006.01) | |
| *G01L 5/00* | (2006.01) | |
| *G06N 3/008* | (2023.01) | |
| *B25J 15/00* | (2006.01) | |

(52) U.S. Cl.
CPC ........... *B25J 9/1612* (2013.01); *B25J 9/1633* (2013.01); *B25J 13/081* (2013.01); *G01G 19/00* (2013.01); *G01L 5/0028* (2013.01); *G06N 3/008* (2013.01); *B25J 15/0009* (2013.01); *G05B 2219/39001* (2013.01)

(58) Field of Classification Search
CPC ...... B25J 9/1612; B25J 9/1633; B25J 13/081; B25J 15/0009; B25J 19/02; B25J 9/1669; B25J 11/00; G01G 19/00; G01G 19/52; G01L 5/0028; G01L 5/228; G06N 3/008; G05B 2219/39001
See application file for complete search history.

(56) References Cited

U.S. PATENT DOCUMENTS 5,802,201 A * 9/1998 Nayar .................... B25J 9/1697
700/251
9,696,338 B2 7/2017 Kishiro
(Continued)

FOREIGN PATENT DOCUMENTS

| CN | 1108520 A | * 9/1995 |
|---|---|---|
| CN | 1065123 C | * 5/2001 |
| JP | S61265294 | 11/1986 |

(Continued)

OTHER PUBLICATIONS

"Office Action of Japan Counterpart Application", issued on May 21, 2024, with English translation thereof, p. 1-p. 8.

*Primary Examiner* — Kidest Bahta
(74) *Attorney, Agent, or Firm* — JCIPRNET

(57) ABSTRACT

A touch sensation sensor is mounted to a hand part of a robot and includes: an obtaining means, obtaining at least one of visual sensation information, which is target object information relating to a target object operated by using the hand part, and touch sensation information, which is the target object information at a time when the target object operated by using the hand part is gripped; and a control device, changing a sensitivity mode of the touch sensation sensor in accordance with the target object information that is obtained.

6 Claims, 17 Drawing Sheets

(56) References Cited

U.S. PATENT DOCUMENTS

2020/0147787 A1\* 5/2020 Takahashi .............. B25J 13/085
2020/0306986 A1\* 10/2020 Keraly ................... B25J 13/085

FOREIGN PATENT DOCUMENTS

| | | | |
|---|---|---|---|
| JP | 2005161450 | | 6/2005 |
| JP | 2006341341 | | 12/2006 |
| JP | 2019198939 | | 11/2019 |
| KR | 20190070386 A | \* | 7/2019 |
| WO | 2013073161 | | 5/2013 |

\* cited by examiner

| Object name | Sensitivity mode | First gain resistance | Second gain resistance | Reference voltage variable resistance |
|---|---|---|---|---|
| Paper cup | High sensitivity mode | | | |
| 2L PET bottle | Wide mode | | | |
| Child | Wide mode | | | |
| ... | ... | ... | ... | ... |

FIG. 5

| Sensitivity pattern | Characteristics | | Target | Object to be gripped | Operation |
|---|---|---|---|---|---|
| | Load range | Resolution | | | |
| I | Low-high | Low | Heavy object, may be handled roughly, load changes greatly | 2L PET bottle Rice bag | Open a bottle Pour water in the 2L PET bottle |
| II | Low-Intermediate low | Intermediate | Load changes at a degree in a low load range | | Switch the smart phone (Value changes for each mounting location) |
| III | Intermediate high-high | Intermediate | Load changes at a degree in a high load range | | Support a person |
| IV | Low | High | Low load, requiring delicate handling | Paper cup, crisps Small animals | |
| V | Intermediate low | High | Slightly low load, requiring delicate handling, precision equipment | Eggs Smart phone Remote controller | |
| VI | Intermediate high | High | Slightly high load, requiring delicate handling, fragile object | Tofu, pottery Animal | |
| VII | High | High | High load, requiring delicate handling | Can | |
| VIII | Intermediate low-intermediate high | Intermediate | Load changes at a degree in an intermediate load range | | Gently touch an adult |
| IX | Low-intermediate high | Intermediate | Load changes at a degree in an intermediate load range | | Gently touch a child |

FIG. 12

| Load range | Power range example [N] |
|---|---|
| Low | 0.01~0.5 (1~50g) |
| Intermediate low | 0.5~2 (50~200g) |
| Intermediate high | 2~10 (200g~1kg) |
| High | 10~ (1kg~) |

FIG. 13

TOUCH SENSATION SENSOR, SENSITIVITY SWITCHING CIRCUIT, AND SENSITIVITY SWITCHING METHOD

CROSS-REFERENCE TO RELATED APPLICATION

This application claims the priority benefit of Japan application serial no. 2021-061187 filed on Mar. 31, 2021. The entirety of the above-mentioned patent application is hereby incorporated by reference herein and made a part of this specification.

BACKGROUND

Technical Field

The invention relates to a touch sensation sensor, a sensitivity switching circuit, and a sensitivity switching method.

Description of Related Art

Technologies have been developed for an operator to sense the sensation of an operation of a robot in the case where the operator operates the robot through remote control, for example. In such case, a touch sensation sensor is installed to a robot hand of the robot, and the touch sensation information detected by the touch sensation sensor is fed back to the operator (e.g., Patent Document 1). In the robot hand, to achieve dexterity and grip strength, the touch sensation sensor mounted to the hand needs to exhibit high sensitivity as well as wide dynamic range.

In such system, the analog data of a resistance type touch sensation sensor is digitalized in an analog-digital conversion means (AD converter) and processed. FIG. 16 is a diagram illustrating a circuit configuration example of a touch sensation system of the conventional technology. As shown in FIG. 16, the output of a sensor 901 is input to an amplification circuit 902. The sensor 901 is of a resistance type in which a resistance value changes with an exerted force. The amplification circuit 902 amplifies the output of the sensor 901 to be output to a central processing unit (CPU). The CPU 903 is provided with an AD converter (ADC) 904. The ADC 904 digitalizes the analog data output by the amplification circuit 902 to be processed.

PRIOR ART DOCUMENT

Patent Document

[Patent Document 1] Japanese Laid-Open No. 2019-198939

FIG. 17 is a diagram illustrating an example of a relation between a force and an input voltage value to an ADC in the conventional example. The vertical axis represents voltage value, and the horizontal axis represents force. It is assumed that the resolution of the ADC 904 described with FIG. 16 is, for example, 10 bits. In the conventional art, when the sensor 901 is of the resistance type, in a diagram X2, although the resolution can be high in a range in which the force is small (low load) and the voltage value is low, but the resolution becomes rough in a range in which the force is large (high load) and the voltage value is high.

In the conventional art, the resolution of the AD converter is device-dependent, and when the gain of voltage is set to measure a wide dynamic range from a low load to a high load, the resolution becomes rough, and it is difficult to exert fine force control in the low load range (high sensitivity side).

SUMMARY

An aspect of the invention provides a touch sensation sensor. The touch sensation sensor s mounted to a hand part of a robot and includes: an obtaining means, obtaining at least one of visual sensation information, which is target object information relating to a target object operated by using the hand part, and touch sensation information, which is the target object information at a time when the target object operated by using the hand part is gripped; and a control device, changing a sensitivity mode of the touch sensation sensor in accordance with the target object information that is obtained.

In the touch sensation sensor according to an aspect of the invention, the control device may detect a weight of the target object based on the touch sensation information, compare the weight that is detected with an object weight that is assumed under the sensitivity mode that is switched, and change the sensitivity mode based on a result of comparison In addition, in the touch sensation sensor according to an aspect of the invention, the obtaining means may include: an analog-digital converter converting the target object information, which is analog data, into digital data; and an amplification part, capable of changing a gain of a signal with respect to the analog data. The control device may change the sensitivity mode by dynamically changing, with respect to the analog data input to the analog-digital converter, a gain or a threshold of the amplification part at a time when the robot operates.

In the touch sensation sensor according to an aspect of the invention, the control device may keep a force before switching starts during a switching period of the sensitivity mode, and, after the switching period of the sensitivity mode, switch to a force calculated by using a force conversion formula after switching to the sensitivity mode.

Another aspect of the invention provides a sensitivity switching circuit, and the sensitivity switching circuit includes: a comparative amplification circuit, comparing and amplifying a voltage value output by a touch sensation sensor mounted to a hand part of a robot with a reference voltage value; a variable resistance, wherein a gain of the comparative amplification circuit is variable in accordance with an instruction for switching a sensitivity mode of the touch sensation sensor; a reference voltage variable resistance, wherein a voltage value output by the touch sensation sensor is variable in accordance with the instruction for switching the sensitivity mode of the touch sensation sensor; and an analog-digital converter, converting an analog value output by the comparative amplification circuit into a digital value.

According to yet another aspect of the invention, a sensitivity switching method for a touch sensation sensor mounted to a hand part of a robot is provided. The sensitivity switching method includes: obtaining, by an obtaining means, at least one of visual sensation information, which is target object information relating to a target object operated by using the hand part, and touch sensation information, which is the target object information at a time when the target object operated by using the hand part is gripped; and changing, by a control device, a sensitivity mode of the touch sensation sensor in accordance with the target object information that is obtained

BRIEF DESCRIPTION OF THE DRAWINGS

FIG. 5 is a diagram illustrating an example of a sensitivity table according to the first embodiment.

FIG. 12 is a diagram illustrating an example of the correspondence among switching modes, load ranges, resolutions, targets, gripped objects and operations according to the first embodiment.

FIG. 13 is a diagram illustrating a relation between load ranges and force range examples according to the first embodiment.

DESCRIPTION OF THE EMBODIMENTS

Figure 1:
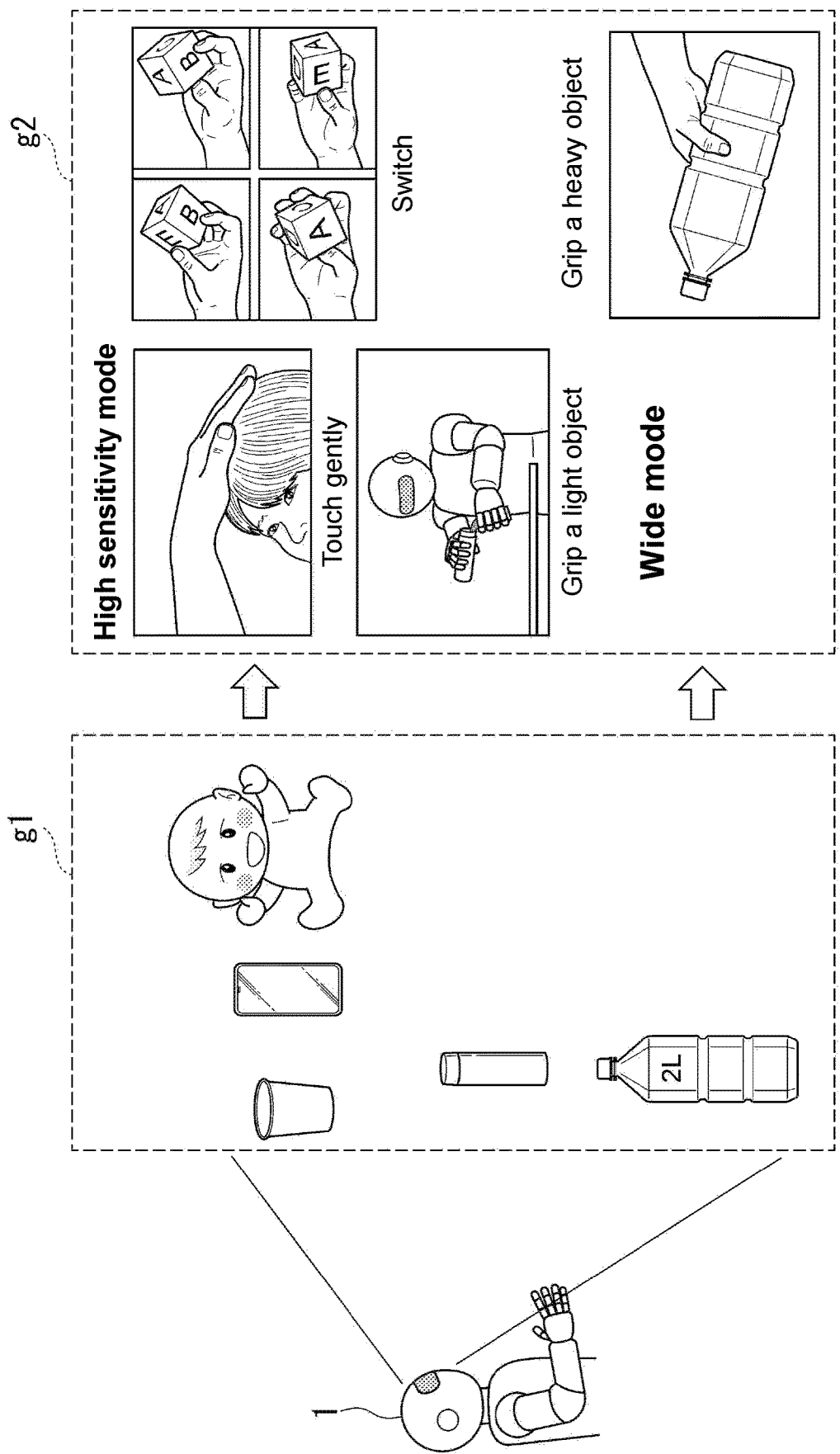
FIG. 1 is a schematic diagram illustrating an embodiment.

The invention provides a touch sensation sensor, a sensitivity switching circuit, and a sensitivity switching method capable of obtaining a resolution of a force corresponding to the object to be handled and coping with both low load and high load.

According to the embodiments of the invention, the sensitivity mode is switched based on at least one of the visual sensation information and the touch sensation information. Therefore, the resolution of the force corresponding to the object to be handled can be obtained, and both low load and high load can be coped with.

In the following, the embodiments of the invention will be described with reference to the drawings. In the drawings for the following description, in order to make the respective components as large as recognizable, the scales of the components are changed as appropriate.

[Outline]

First of all, the embodiment is briefly outlined.

FIG. 1 is a schematic diagram illustrating an embodiment. In the embodiment, an object is recognized based on visual sensation information (target object information), and the sensitivity of a touch sensation sensor is switched based on the result of recognition. Alternatively, after the object is recognized based on the visual sensation information (target object information) and the sensitivity of the touch sensation sensor is switched based on the result of recognition, the sensitivity is calibrated based on touch sensation information (target object information). Alternatively, in the embodiment, the sensitivity of the touch sensation sensor is switched (or calibrated) by using distance information with an object or temperature information, etc.

The object, as shown in a region g1 surrounded by a chain line, may be, for example, a light object, a soft object, a small object, a rigid object, a heavy object, a child or an infant, etc. The sensitivity of the touch sensation sensor includes, for example, a high sensitivity mode and a wide sensitivity mode. The operation performed by the robot, as shown in a region g2 surrounded by a chain line, may be, for example, touching a child's head gently, switching an object, gripping a light object, gripping a heavy object, opening a bottle, etc. Examples suitable for the high sensitivity mode include, for example, gently touching a child's head, switching an object, gripping a light object, etc. Examples suitable for the wide mode include, for example, gripping a heavy object, etc. It is noted that in-hand manipulation refers to a switching operation in a gripping state.

First Embodiment

In the embodiment, the sensitivity of the touch sensation sensor is switched based on the visual sensation information.

[Configuration of Robot Hand]

Figure 2:
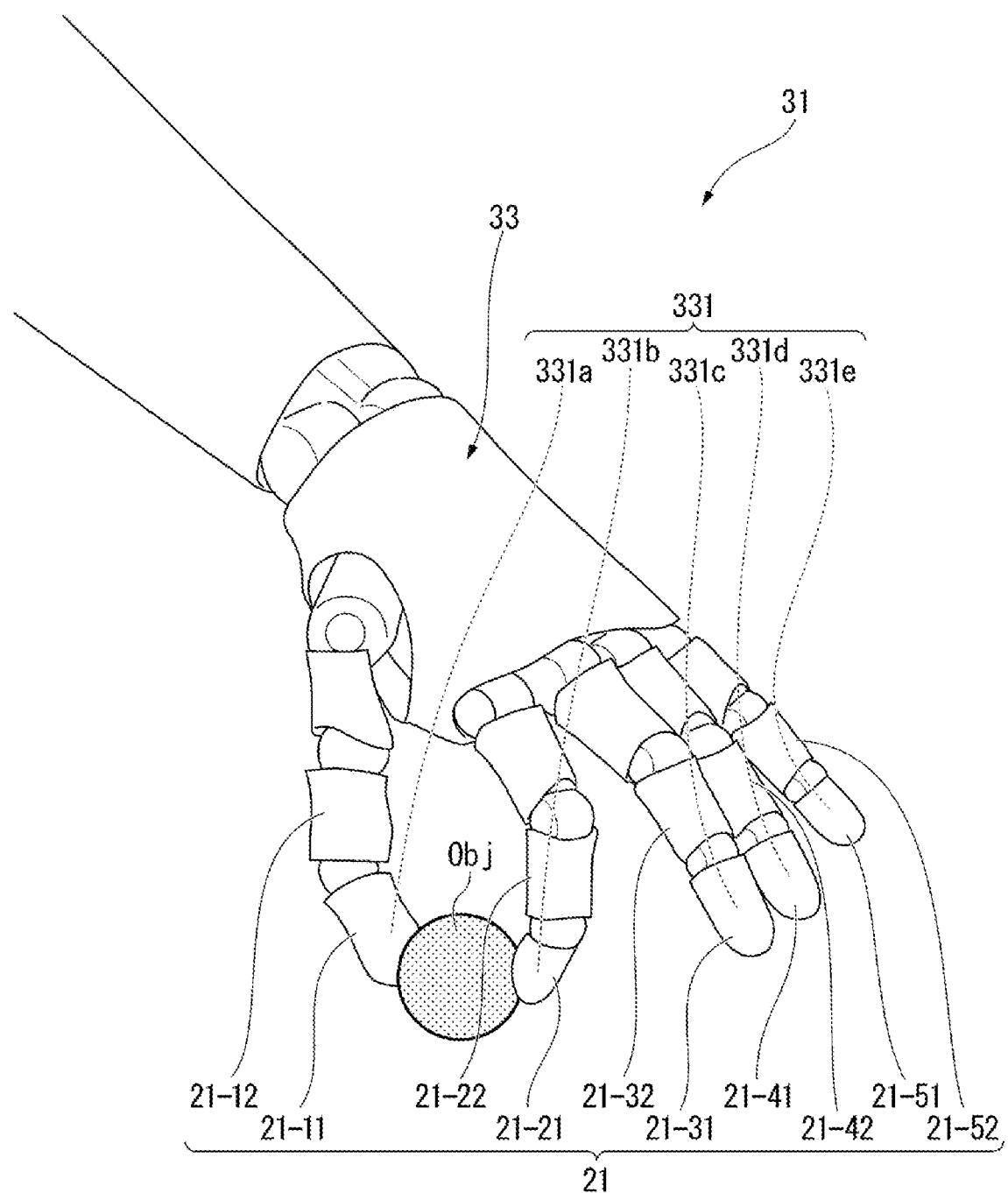
FIG. 2 is a view illustrating a configuration example of a robot hand according to a first embodiment.

FIG. 2 is a view illustrating a configuration example of a robot hand according to the embodiment. As shown in FIG. 2, a robot hand 31 includes a gripping part 33. The gripping part 33, for example, includes five finger parts 331 (thumb 331a, index finger 331b, middle finger 331c). Each finger part 331 includes multiple joints and finger segments. Moreover, a sensor 21 (obtaining means) (sensor 21-11 (obtaining means), sensor 21-12 (obtaining means), sensor 21-21 (obtaining means), sensor 21-22 (obtaining means), sensor 21-31 (obtaining means), sensor 21-32 (obtaining means), sensor 21-41 (obtaining means), sensor 21-42 (obtaining means), sensor 21-51 (obtaining means), sensor 21-52 (obtaining means)), for example, is mounted to the respective finger segments of the fingers.

It is noted that the configuration of FIG. 2 is merely an example, and the configuration of the robot hand 31 is not limited thereto. For example, the number of the finger parts 331 is not limited to 5, as long as the number is 2 or more. In addition, the sensor 21 may also be mounted to the first finger segment (the underside of the finger tip) only

[Configuration of Robot]

Figure 3:
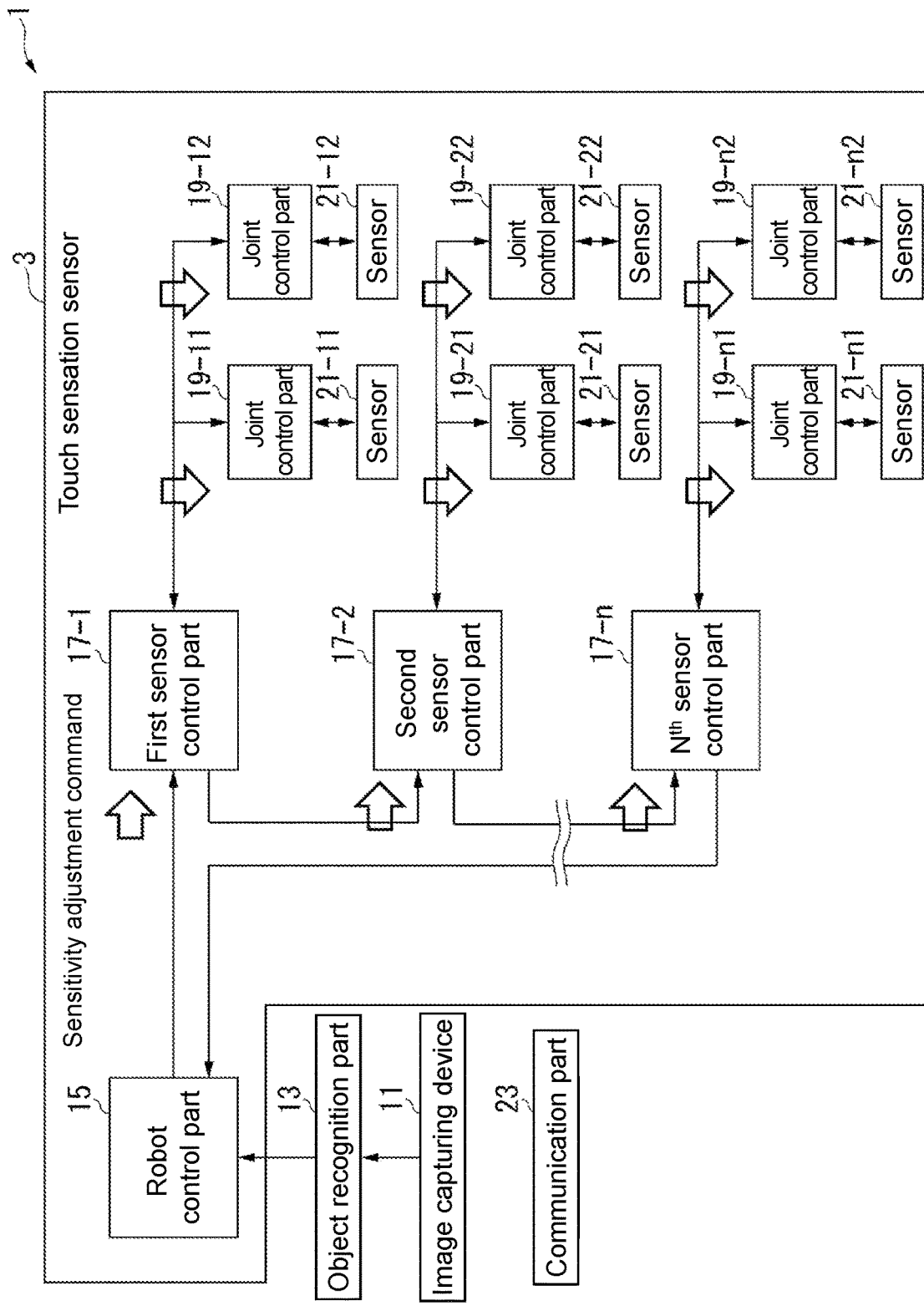
FIG. 3 is a diagram illustrating a configuration example of a robot including a touch sensation sensor according to the first embodiment.

FIG. 3 is a diagram illustrating a configuration example of a robot including a touch sensation sensor according to the embodiment. As shown in FIG. 3, the robot 1 includes an image capturing device 1 (obtaining means), an object recognition part 13 (obtaining means), and a touch sensation sensor 3.

The touch sensation sensor 3, for example, includes a robot control part 15 (control device, obtaining means), a first sensor control part 17-1, a second sensor control part 17-2, . . . , an $n^{th}$ sensor control part 17-$n$, a joint control part 19-11, a joint control part 19-12, a joint control part 19-21, a joint control part 19-22, . . . , a joint control part 19-$n$1, a joint control part 19-$n$2, the sensor 21-11, the sensor 21-12, the sensor 21-21, the sensor 21-22, . . . , the sensor 21-$n$1, the sensor 21-$n$2, and a communication part 23.

The robot 1 includes a power part (not shown) supplying power to each part. In the following, when the description does not intend to specify an individual sensor control part among the first sensor control part 17-1, the second sensor control part 17-2, . . . , the $n^{th}$ sensor control part 17-$n$, the sensor control part is generally referred to as "sensor control part 17". In addition, when the description does not intend to specify an individual joint control part among the joint control part 19-11, the joint control part 19-12, the joint control part 19-21, the joint control part 19-22, . . . , the joint control part 19-$n$1, and the joint control part 19-$n$2, the joint control part is generally referred to as "joint control part 19".

The image capturing device 11, for example, includes an RGB camera and a depth sensor.

The object recognition part 13 detects object information, such as the three-dimensional position and the size of the target object in the captured image, by carrying out a conventional process, based on the captured image and the detection result detected by using and the sensor. The object recognition part 13 refers to a pattern matching model, etc., stored therein, and performs an image process (e.g., edge detection, binary process, feature amount extraction, image emphasizing process, image extraction, pattern matching process, etc.) with respect to the captured image, and surmise the object name. In the case where multiple objects are detected from the captured image, the object recognition part 13 detects object information for each of the objects.

The robot control part 15 determines whether to switch the sensitivity of the sensor 21 based on the visual sensation information recognized by the object recognition part 13 and a sensitivity table stored in the robot control part 15 itself. Details concerning the sensitivity table will be described in the following. The robot control part 15 generates a sensitivity adjustment command based on the determination result, and outputs the generated sensitivity adjustment command to the first sensor control part 17-1. The sensitivity adjustment command may also include target information which identifies the sensor 21 as a control target.

The sensor control part 17 obtains the sensitivity adjustment command. The sensor control part 17 obtains detected data. The detected data is detected by a sensor and is converted into digital data by the joint control part. The sensor control part 17 outputs the detected data to the robot control part 15.

The first sensor control part 17-1 outputs the sensitivity adjustment command output by the robot control part 15 to the joint control part 19-11, the joint control part 19-12, and the second sensor control part 17-2. The first sensor control part 17-1 obtains the detected data respectively output by the joint control part 19-11 and the joint control part 19-12, and outputs the obtained detected data to the second sensor control part 17-2.

The second sensor control part 17-2 outputs the sensitivity adjustment command output by the first sensor control part 17-1 to the joint control part 19-21, the joint control part 19-22, and a third sensor control part 17-3 (not shown). The second sensor control part 17-2 obtains the detected data respectively output by the joint control part 19-21 and the joint control part 19-22 and the detected data output by the first sensor control part 17-1, and outputs the obtained detected data to the third sensor control part 17-3.

The $n^{th}$ sensor control part 17-$n$ outputs the sensitivity adjustment command output by the first sensor control part 17-$(n-1)$ (not shown) to the joint control part 19-$n$1 and the joint control part 19-$n$2. The $n^{th}$ sensor control part 17-$n$ obtains the detected data respectively output by the joint control part 19-$n$1 and the joint control part 19-$n$2 and the detected data output by the second sensor control part 17-2, and outputs the obtained detected data to the robot control part 15.

The joint control part 19 switches the sensitivity of the sensor 21 in correspondence with the sensitivity adjustment command. Details concerning the configuration example and the operation of the joint control part 19 will be described in the following.

The sensor 21 is a touch sensation sensor, and detects a force to an object (a pressure exerted by a finger). The sensor 21 may also include the joint control part 19.

[Configuration Example of Joint Control Part 19]

In the following, the configuration example of the joint control part 19 will be described.

Figure 4:
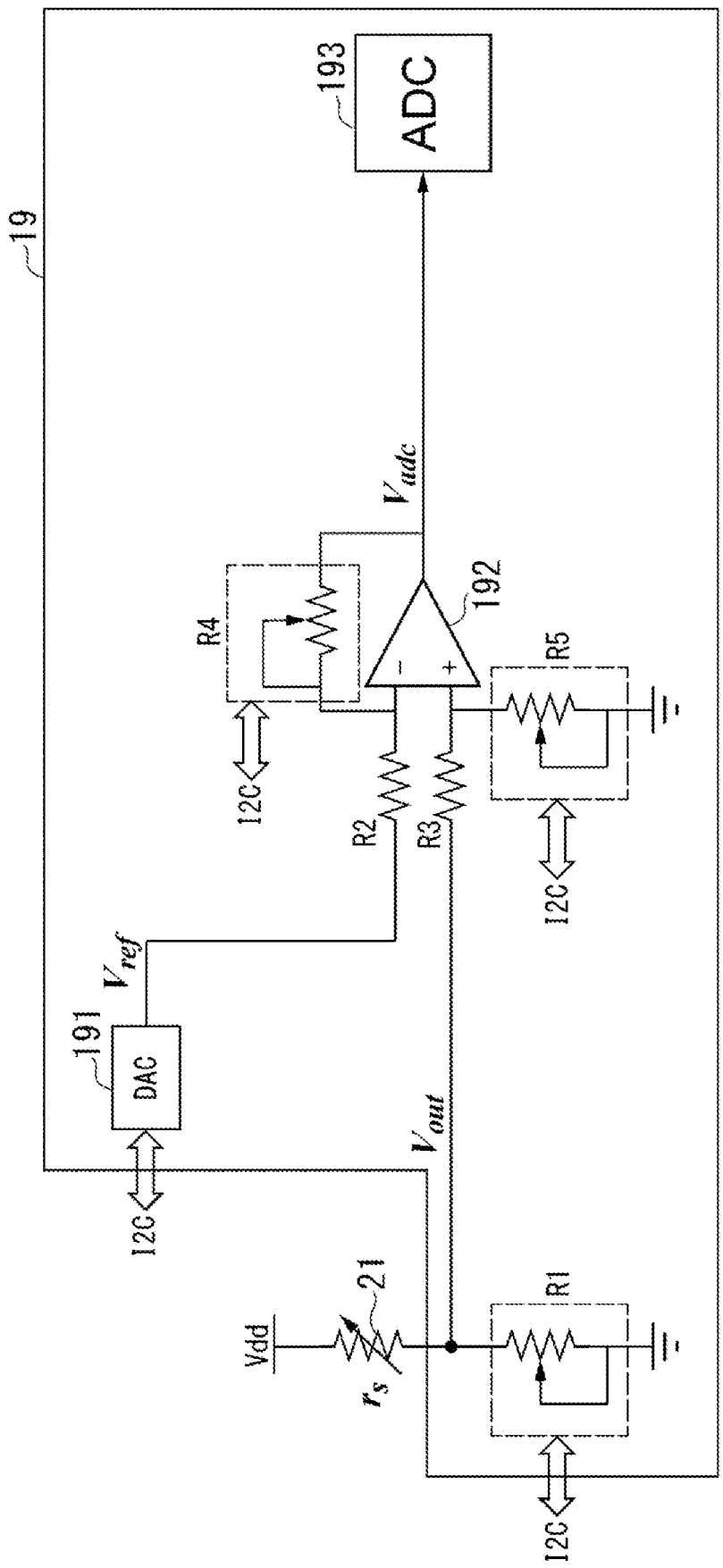
FIG. 4 is a diagram illustrating a configuration example of a joint control part according to the first embodiment.

FIG. 4 is a diagram illustrating a configuration example of a joint control part according to the embodiment. As shown in FIG. 4, the joint control part 19, for example, includes a variable resistance R1 (reference voltage variable resistance), a resistance R2, a resistance R3, a variable resistance R4 (first gain resistance, gain variable resistance), a variable resistance R5 (second gain resistance, gain variable resistance), a digital-analog converter (DAC) 191, and a comparative amplification circuit 192, and an ADC 193. It is noted that the configuration example of the joint control part 10 shown in FIG. 4 merely serves as an example, and the invention is not limited thereto.

An end of the sensor 21 is connected to a voltage VDD, and the other end of the sensor 21 is connected to an end of the variable resistance R1 and an end of the resistance R3.

The other end of the variable resistance R1 is grounded, and a resistance value $rr_ef$ is variable according to the adjustment data representing the adjustment amount based on the sensitivity adjustment command.

The input terminal of the DAC 191 receives the adjustment data, and the output terminal of the DAC 191 is connected to an end of R2.

The other end of the resistance R2 is connected to a negative input terminal of the comparative amplification circuit 192 and an end of the variable resistance R4.

The other end of the resistance R3 is connected to a positive input terminal of the comparative amplification circuit 192 and an end of the variable resistance R5.

The other end of the variable resistance R4 is connected to the output terminal of the comparative amplification circuit 192 and the input terminal of ADC, and a resistance value $r_{g2\_1}$ is variable according to the adjustment data.

The other end of the variable resistance R5 is grounded, and a resistance value $r_{g2\_2}$ is variable according to the adjustment data.

The variable resistance R1, the variable resistance R4, and the variable resistance R5 are, for example, digital potentiometers. In addition, the adjustment data is transmitted by the joint control part 19 to the respective parts through, for example, serial communication (I2C).

Here, the resistance value of the sensor 21 is set as $r_s$, the resistance value of the variable resistance R1 is set as rref, the resistance value of the resistance R2 is set as Rg1, the resistance value of the resistance R3 is set as Rg1, the resistance value of the variable resistance R4 is set as $r_{g2\_1}=(r_{g2})$, and the resistance value of the variable resistance R5 is set as $r_{g2\_2}=(r_{g2})$. In addition, the output voltage of the DAC 191 is set as Vref.

The output voltage Vout of the sensor 21 is represented in Formula (1) in the following.

[Formula 1]

$$V_{out} = \frac{r_{ref}}{r_s + r_{ref}} Vdd \quad (1)$$

In addition, the input voltage Vadc of the ADC 193 is represented as Formula (2) in the following.

[Formula 2]

$$V_{adc} = \frac{r_{g2}}{R_{g1}}(V' - V_{ref}) \quad (2)$$

[Example of Sensitivity Table]

Then, an example of the sensitivity table is described.

FIG. 5 is a diagram illustrating an example of a sensitivity table according to the embodiment. As shown in FIG. 5, in the sensitivity table, for example, the associations of object names with sensitivity modes, resistance values of the first gain resistance, resistance values of the second gain resistance, and resistance values of the reference voltage variable resistance, for example, are provided.

It is noted that the sensitivity table shown in FIG. 5 is merely an example, and the invention is not limited thereto.

[Example of Processing Procedures]

In the following, an example of the processing procedures of the robot 1 is described.

Figure 6:
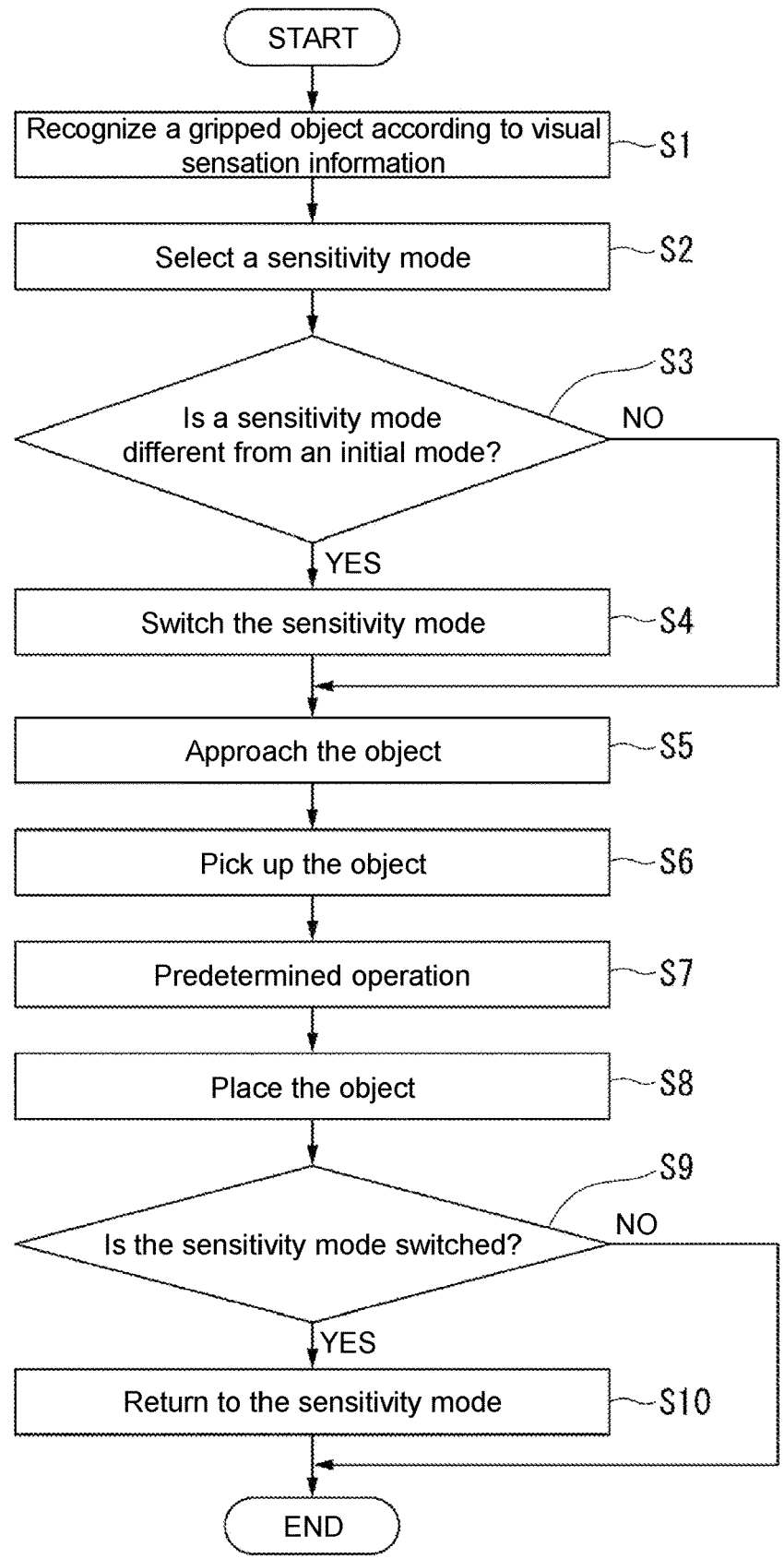
FIG. 6 is a flowchart illustrating an example of processing procedures of the robot according to the first embodiment.

FIG. 6 is a flowchart illustrating an example of processing procedures of the robot according to the embodiment.

(Step 1) The object recognition part 13 recognizes the object information, such as the location of the object, the size of the object, the object name, etc., by performing an image process with respect to the image captured by the image capturing device 11 by carrying out a conventional process.

(Step S2) The robot control part 15 selects the sensitivity mode based on the result recognized by the object recognition part 13.

(Step S3) The robot control part 15 determines whether the selected sensitivity mode is different from the initial mode. If the robot control part 15 determines that the selected sensitivity mode is different from the initial mode (Step 3: YES), the flow proceeds to the process of Step S4. If the robot control part 15 determines that the selected sensitivity mode is not different from the initial mode (Step 3: NO), the flow proceeds to the process of Step S5.

(Step S4) The robot control part 15 switches to the selected sensitivity mode.

(Step S5) The robot control part 15 exerts control so that the robot hand 3 approaches the object (approaching object).

(Step S6) The robot control part 15 controls the robot hand 31 to pick up the object.

(Step S7) The robot control part 15 controls the robot hand 31 to perform a predetermined operation (e.g., in-hand manipulation).

(Step S8) The robot control part 15 controls the robot hand 31 to place (leave, put down) the object.

(Step S9) The robot control part 15 determines whether the sensitivity mode is switched. If the robot control part 15 determines that the sensitivity mode is switched (Step 9: YES), the flow proceeds to the process of Step S10. If the robot control part 15 determines that the sensitivity mode is not switched (Step 9: NO), the process is ended.

(Step S10) The robot control part 15 switches to the sensitivity mode and returns to the initial mode.

[Processing Example at the Time of Switching Sensitivity]

Then, an example of switching sensitivity is described.

Figure 7:
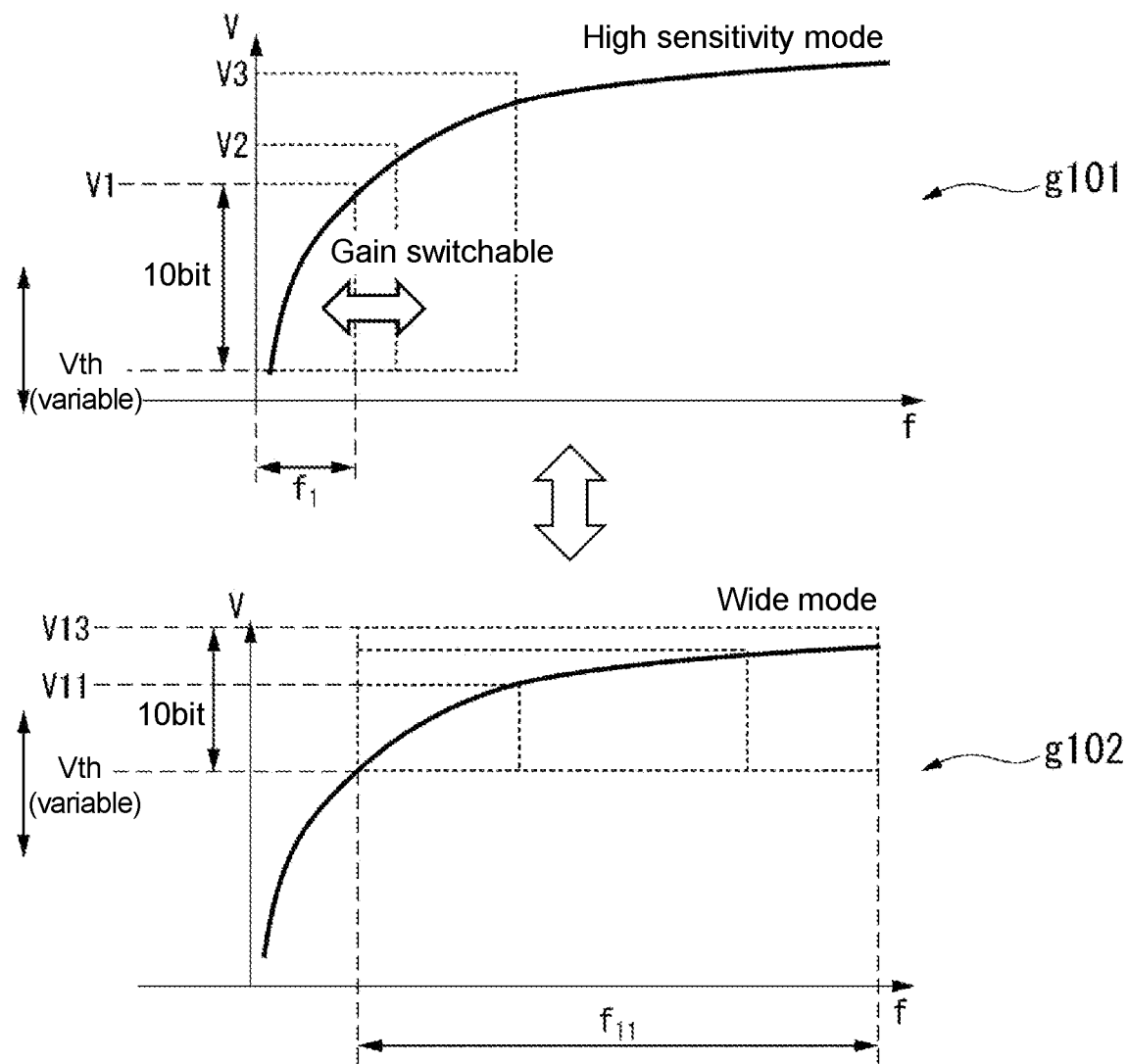
FIG. 7 is a diagram illustrating an example of a high sensitivity mode and a wide mode according to the first embodiment.

FIG. 7 is a diagram illustrating an example of a high sensitivity mode and a wide mode according to the embodiment. A graph g101 represents the relation between the force in the case of high sensitivity mode and the input voltage to the ADC 193. A graph g102 represents the relation between the force in the case of wide mode and the input voltage to the ADC 193. In the graphs g101 and g102, the horizontal axis represents force, and the vertical axis represents voltage value. The resolution of the ADC 193 is 10 bits.

As shown in the graph g101, the high sensitivity mode is used in the case where the force is less than a predetermined value, for example. Then, by adjusting the resistance value of the first gain resistance, the resistance value of the second gain resistance, and the resistance value of the reference voltage variable resistance, for example, 10 bits are applied to threshold voltage Vth to V1. Alternatively, in the high sensitivity mode, for example, 10 bits are applied to voltage values Vth to V2. It is noted that the threshold voltage Vth is variable. Accordingly, even in the high sensitivity mode, the number of combinations of the resistance value of the first gain resistance, the resistance value of the second gain resistance, and the resistance value of the reference voltage variable resistance may be multiple.

As shown in the graph g102, the wide mode is used in the case where the force is equal to or greater than a predetermined value, for example. In addition, by adjusting the resistance value of the first gain resistance, the resistance value of the second gain resistance, and the resistance value of the reference voltage variable resistance, for example, 10 bits are applied to threshold voltages Vth to V11. Alternatively, in the wide sensitivity mode, for example, 10 bits are applied to voltage values Vth to V13. It is noted that the threshold voltage Vth is variable. Accordingly, even in the wide mode, the number of combinations of the resistance value of the first gain resistance, the resistance value of the second gain resistance, and the resistance value of the reference voltage variable resistance may be multiple.

As shown in the graph g101 and the graph g102, in the high sensitivity mode, the range of the input voltage to the ADC 193 is wider than that of the wide mode, and a force range $f_1$ is narrower than that of the wide mode.

As shown in the graph g101 and the graph g102, in the wide mode, a force range $f_{11}$ is wider than that of the high sensitivity mode, and the range of the input voltage to the ADC 193 is narrower than that of the high sensitivity mode.

It is noted that the respective voltages, threshold voltages, and force ranges shown in FIG. 7 are merely an example, and the invention is not limited thereto.

Then, an example of processing procedures of gain switching in the high sensitivity mode will be described.

Figure 8:
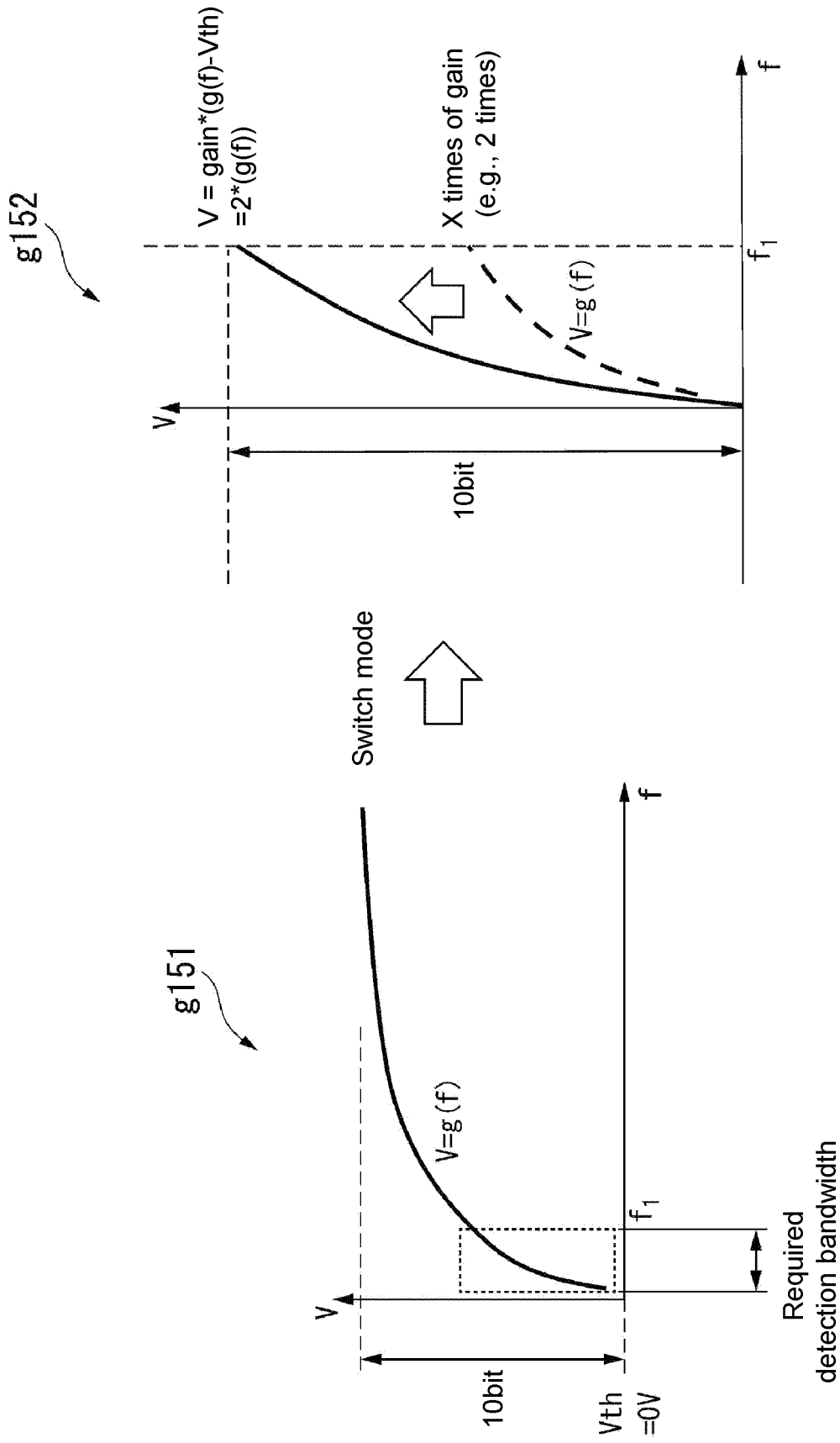
FIG. 8 is a diagram illustrating an example of processing procedures of gain switching of the high sensitivity mode according to the first embodiment.

FIG. 8 is a diagram illustrating an example of processing procedures of gain switching of the high sensitivity mode according to the embodiment. In graphs g151 and g152, the horizontal axis represents force, and the vertical axis represents voltage value.

The graph g151 is a graph before mode switching. The relationship between a voltage V and a force f is set as V=g(f), and the threshold voltage Vth is set as 0(V). Here, a required detection bandwidth which needs to be detected by the sensor 21 is set as $f_1$.

The graph g152 is a graph after mode switching.

In the high sensitivity mode, the relationship between the voltage V and the force f when the gain is two-fold, for example, is set as V=gain×(g(f)−Vth)=2×g(f).

Then, an example of processing procedures of gain switching in the wide mode will be described.

Figure 9:
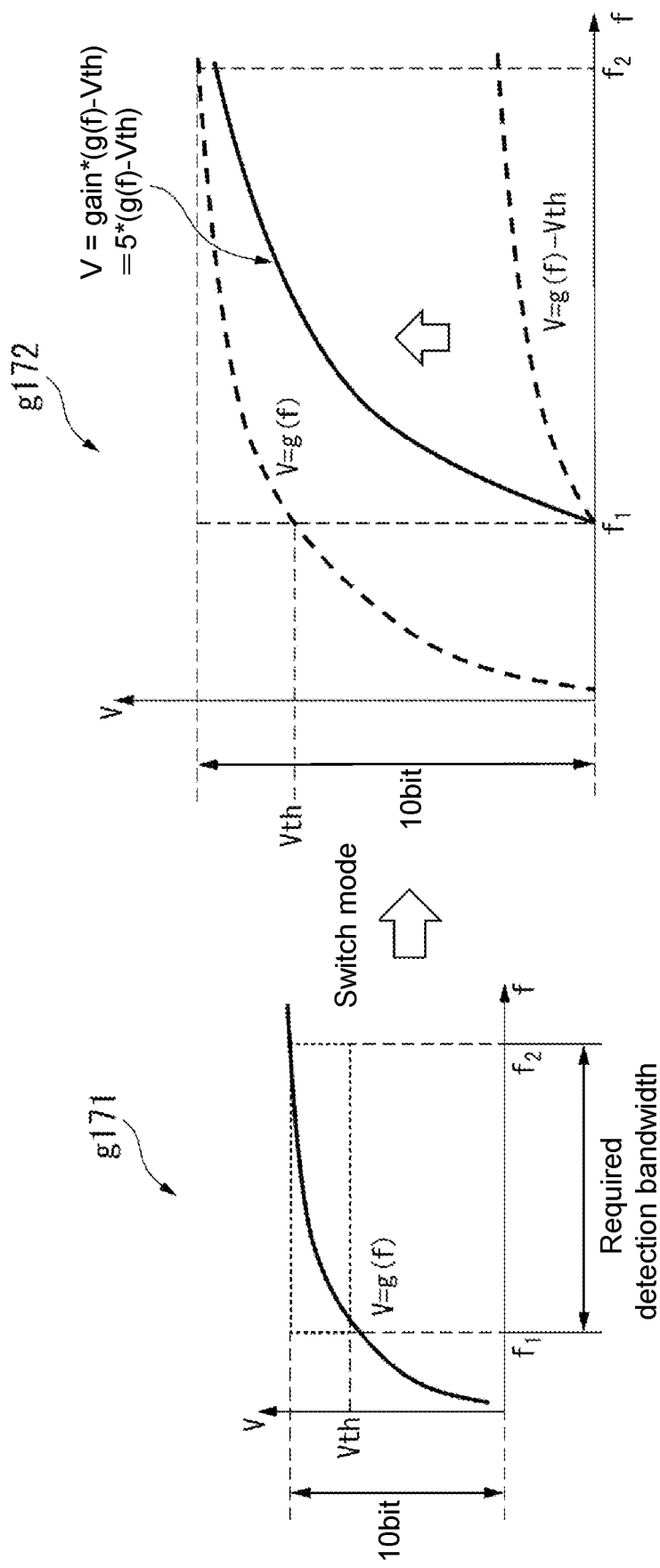
FIG. 9 is a diagram illustrating an example of processing procedures of gain switching of the wide mode according to the first embodiment.

FIG. 9 is a diagram illustrating an example of processing procedures of gain switching of the wide mode according to the embodiment. In graphs g171, g172, and g173, the horizontal axis represents force, and the vertical axis represents voltage value.

The graph g171 is a graph before mode switching. The relationship between the voltage V and the force f is set as V=g(f). Here, a required detection bandwidth which needs to be detected by the sensor 21 is set as $f_1$ to $f_2$.

The graph g172 is a graph after mode switching.

In the wide mode, the relationship between the voltage V and the force f when the gain is five-fold, for example, is set as V=gain×(g(f)−Vth)=5×(g(f)−Vth).

Here, the adjustment data with respect to the resistance value of the first gain resistance, the resistance value of the second gain resistance, and the resistance value of the reference voltage variable resistance is, for example, input by using serial data. Therefore, time differences may occur in the timings at which the resistance value of the first gain resistance, the resistance value of the second gain resistance, and the resistance value of the reference voltage variable resistance change. In addition, due to a current change resulting from an analog circuit or the chattering of the switching operation of the switching means, etc., even if the same force $f_1$ is applied, the value of the voltage V may differ before and after gain switching. As a result, at the time when the analog circuit switches, it is possible that the voltage may suddenly become unstable. Therefore, an erroneous operation may occur in object gripping control (force control).

Figure 10:
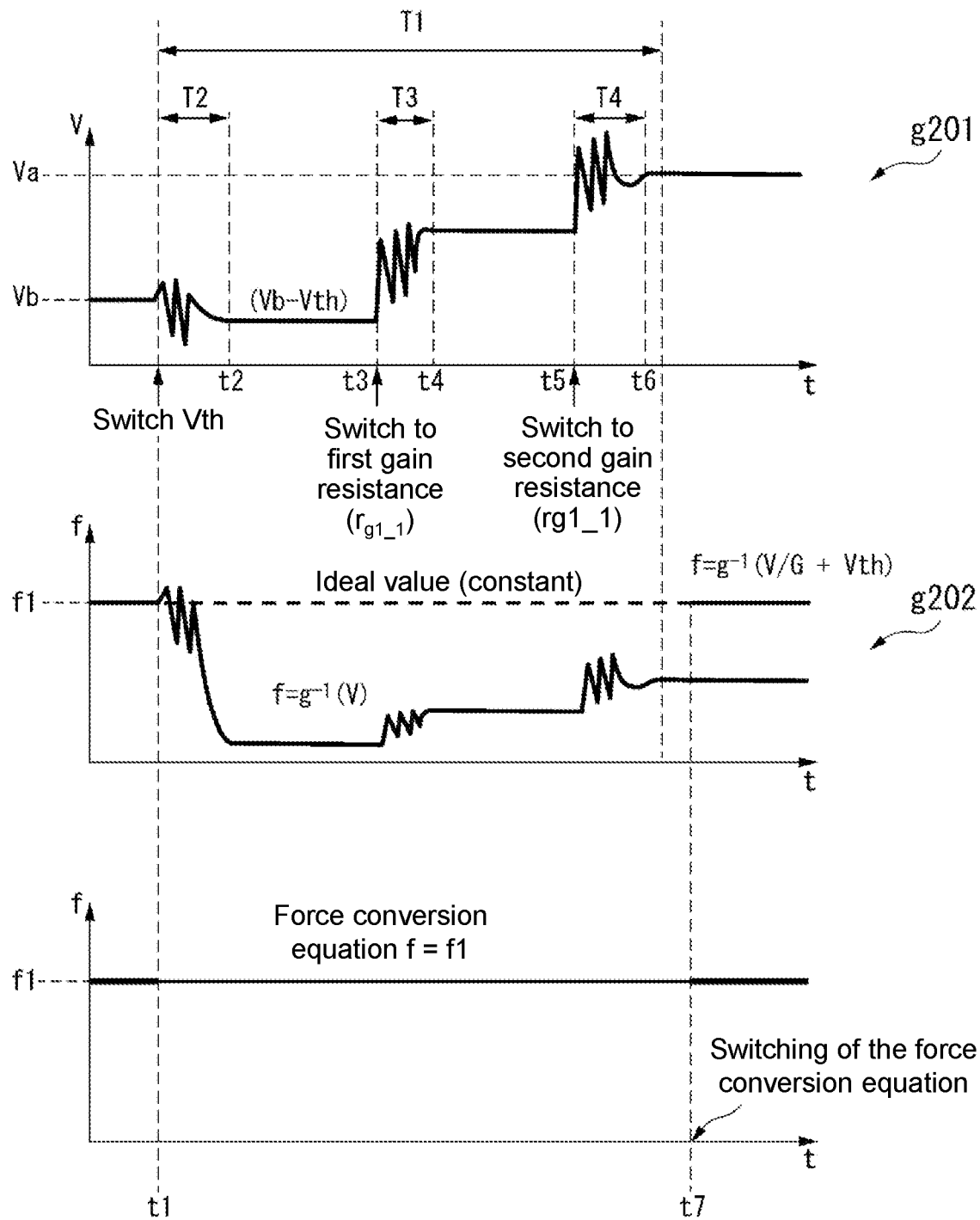
FIG. 10 is a diagram of an operation example at the time of gain switching.

FIG. 10 is a diagram of an operation example at the time of gain switching.

The graph g201 illustrates a time difference due to communication at the time of gain switching and an unstable region. The horizontal axis represents time, and the vertical axis represents voltage. At the time of a time t1, the threshold voltage Vth is switched, and a period T2 from the time t1 to a time t2 is an operation unstable region. At a time t3, the resistance value of the first gain resistance is switched, and a period T3 from the time t3 to a time t4 is an operation unstable region. At a time t5, the resistance value of the second gain resistance is switched, and a period T4 from the time t4 to a time t6 is an operation unstable region. In addition, a period T1 from the time t1 to a time t7 illustrates the time difference of setting due to communication. As shown in the graph g201, due to the gain switching, although the voltage is intended to be changed from a voltage value Vb to Va, the voltage change is manifested in steps and contains unstable periods.

A graph g202 illustrates a relation between time and force at the time when the gain switching as in the graph g201 is carried out. The horizontal axis represents time, and the vertical axis represents force. As shown in the graph g202, the force of a utilization value is fixed at f1. However, the force during the gain switching period T1 is not constant. Therefore, if the data during the period T1 is used in control data, an erroneous operation may occur. Thus, the data during the period T1 cannot be used. It is noted that the force conversion formula during the period from the time t1 to the time t7 is represented as $f=g^{-1}(V)$, and the force conversion formula after the time t7 is represented as $f=g^{-1}$ (V/G+Vth).

Comparatively, in the embodiment, as shown in the graph g173, the force f1 before the switching starts is maintained during the period of the time difference of setting due to communication (switching period). The graph 173 is a graph representing the relation between force and time at the time of gain switching of the embodiment. Accordingly, the force conversion formula until the time t1 is represented as $f=g^{-1}(V)$, the force conversion formula during the period from the time t1 to the time t7 is represented as f=f1, and the force conversion formula after the time t7 is represented as $f=g^{-1}(V/G+Vth)$.

With such process, according to the embodiment, the influence of the time difference due to communication at the time of switching, the influence of the chattering of switching, the influence of current change due to the analog circuit, etc., can be avoided. It is noted that the robot control part 15 can dynamically change the switching of the gain, the switching of the threshold through communication during the operation of the robot 1.

Modified Example

In the above example, the gain modes are described, as an example, with two modes, i.e., the high sensitivity mode and the wide mode, but the number of gain modes may be two or more. In this case, as shown in FIG. 11, some ranges may be provided with respect to the force f.

Figure 11:
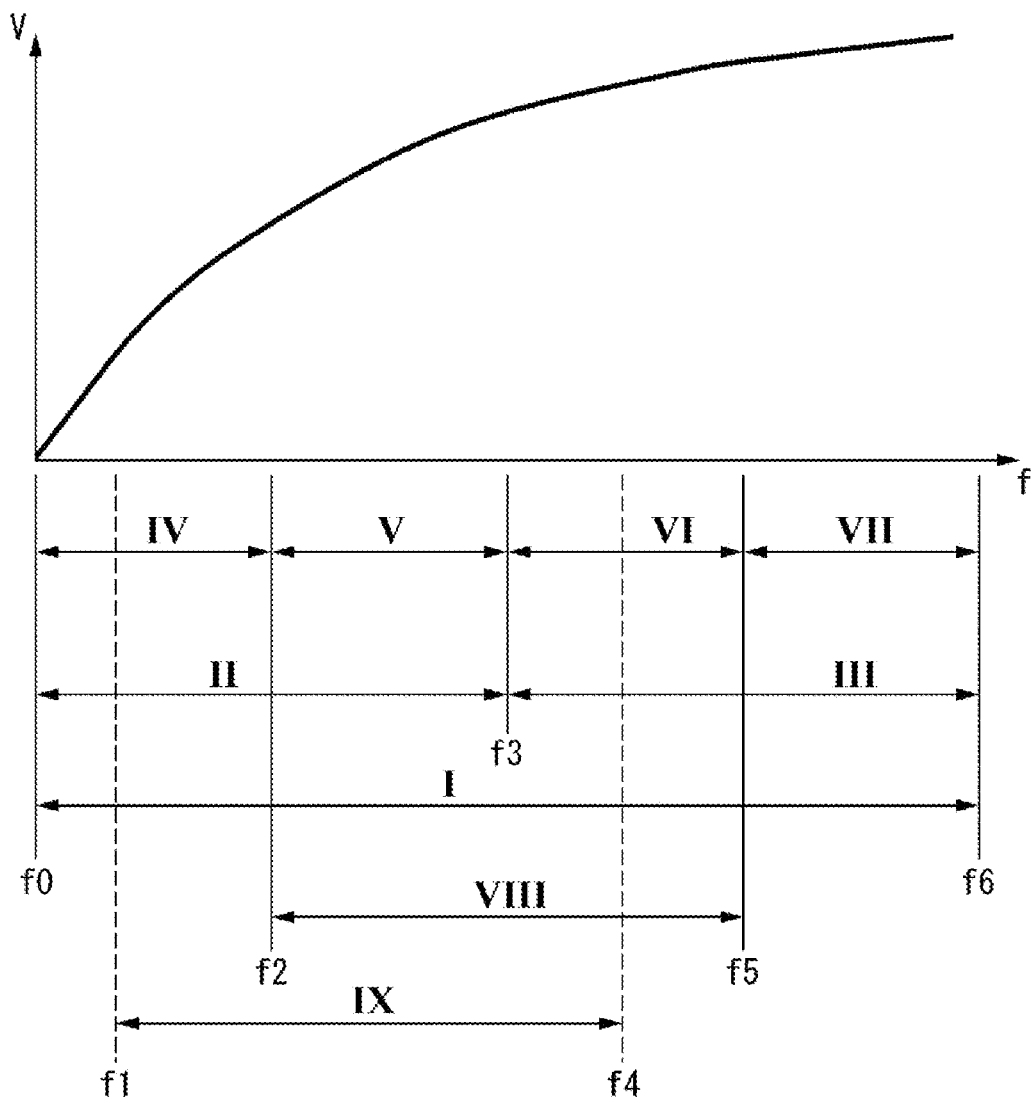
FIG. 11 is a diagram illustrating an example of ranges of gain switching in a modified example.

FIG. 11 is a diagram illustrating an example of the ranges of gain switching in a modified example. In FIG. 11, the horizontal axis represents force, and the vertical axis represents the input voltage to the ADC. A mode I is a mode covering a range of forces f0 to f6. Modes II and III are modes covering the range of the forces f0 to f6 by using two modes. Modes IV and VII are modes covering the range of the forces f0 to f6 by using four modes. A mode VIII is a mode covering a portion, i.e., f2 to f5, of the range of the forces f0 to f6. A mode IX is a mode covering a portion, i.e., f1 to f4, of the range of the forces f0 to f6.

The robot control part 15 switches the modes shown in FIG. 11 in accordance with the recognized objects as shown in FIG. 12, for example. FIG. 12 is a diagram illustrating an example of the correspondence among the switching modes, load ranges, resolutions, targets, gripped objects and operations according to the embodiment. The robot control part 15 stores the relation of FIG. 12. Alternatively, the robot control part 15 may also access and store the relation via a network, etc.

As shown in FIG. 12, for example, the mode I is a mode in which the load range is "low-high", the resolution is "low", the target is a "heavy object, may be handled roughly, load changes greatly", etc., the gripped object is "a 2 L PET bottle, a rice bag", etc., and the operation is to "open a bottle, pour water in the 2 L PET bottle", etc.

In addition, for example, the mode V is a mode in which the load range is "intermediate low", the resolution is "high", the target is "slightly low load, requiring delicate handling, precision equipment", etc., and the gripped object is an "egg, smart phone, remote controller", etc.

Moreover, for example, the mode IX is a mode in which the load range is "intermediate", the resolution is "intermediate", the target is one in which "load changes at a degree in an intermediate load range", etc., and the operation is to "gently touch a child".

FIG. 13 is a diagram illustrating a relation between load ranges and force range examples according to the embodiment. As shown in FIG. 13, the force range of the load range "low" is, for example, "0.01 to 0.5 (N), 1 to 50 (g)". The force range of the load range "intermediate low" is, for example, "0.5 to 0.2 (N), 50 to 200 (g)". The force range of the load range "intermediate high" is, for example, "2 to 10 (N), 200 (g) to 10 (kg)". The force range of the load range "high" is, for example, "10 (N) or more, 10 (kg) or more".

It is noted that the switching modes shown in FIGS. 11 and 12 are merely an example. The invention is not limited thereto. In addition, the load ranges, resolutions, targets, gripped objects, and operations of the switching modes shown in FIG. 12 are merely an example. The invention is not limited thereto. The force range examples of the load ranges shown in FIG. 13 also merely serve as an example. The invention is not limited thereto. Moreover, the respective ranges may be fixed and may also be variable. In the case where the range width is variable, for example, the range is varied based on the detection value of the sensor 21 actually detected.

It is noted that the robot control part 15 may predict a future state or an operation change and change the range. In the case of gripping a cup and pouring water into or out of the cup, the robot control part 15 may make prediction based on the result of recognizing the environment based on the visual sensation information.

According to the above, in the embodiment, the sensitivity of the ADC 193 into which the output of the sensor 21 is input is switched in accordance with the object recognized based on the visual sensation information. In addition, in the embodiment, the switching of the sensitivity mode is performed by using gain switching and reference voltage switching. Moreover, in the embodiment, the force is kept constant during the period of the switching timing due to communication at the time of mode switching.

Therefore, according to the embodiment, the resolution of force in accordance with the object to be handled can be obtained, and a dexterous operation and a powerful operation can both be realized by using the same system. Furthermore, according to the embodiment, an erroneous operation resulting from the variation such as switching timing, etc., due to communication at the time of switching, etc., can be avoided.

Second Embodiment

In the embodiment, the sensitivity of the touch sensation sensor is switched based on the visual sensation information and touch sensation information.
(Configuration of Robot)

Figure 14:
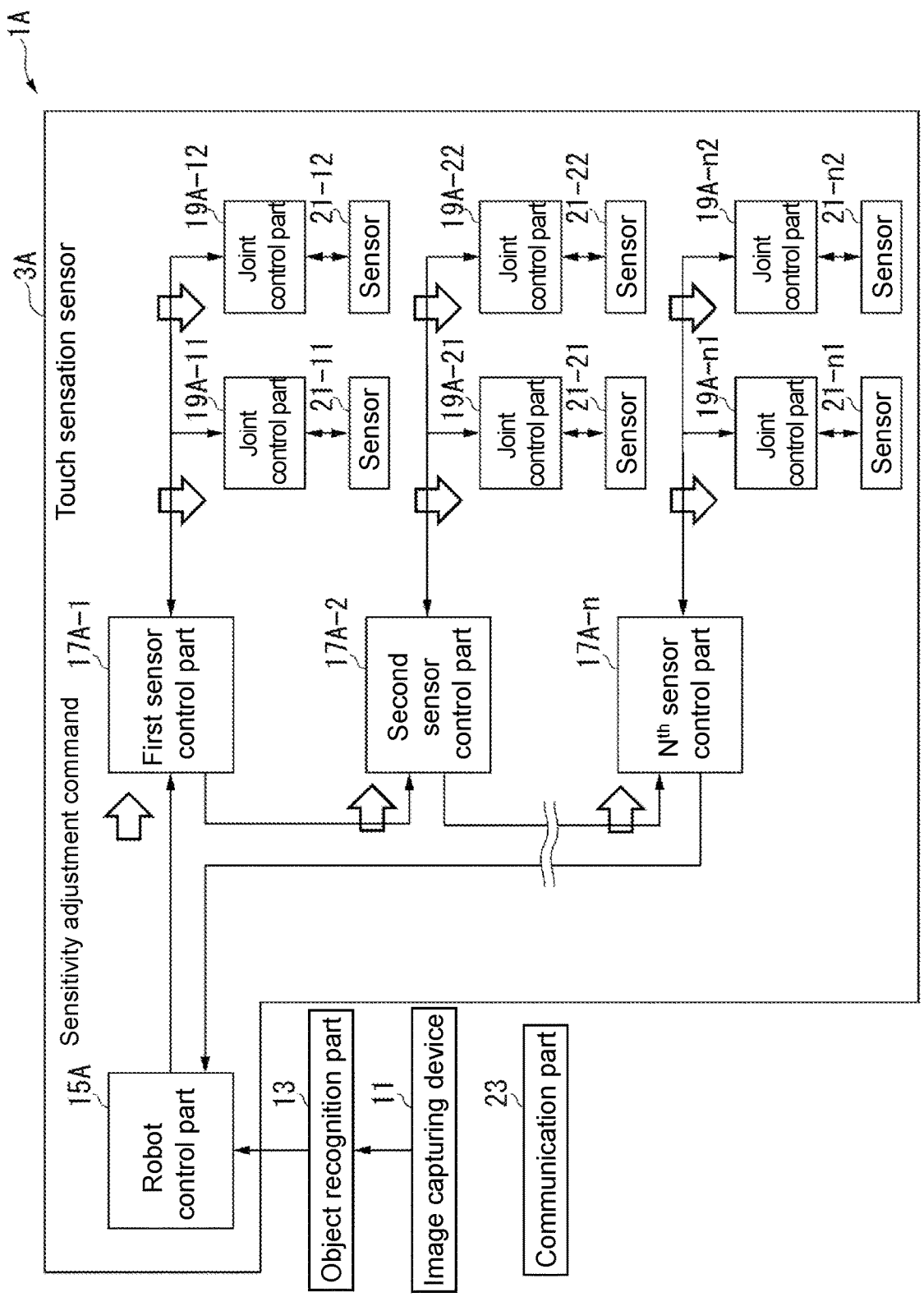
FIG. 14 is a diagram illustrating a configuration example of a robot including a touch sensation sensor according to a second embodiment.

FIG. 14 is a diagram illustrating a configuration example of a robot including a sensor according to the embodiment. As shown in FIG. 14, a robot 1A includes the image capturing device 1 (obtaining means), the object recognition part 13 (obtaining means), and a touch sensation sensor 3A.

The touch sensation sensor 3A, for example, includes a robot control part 15A (control device, obtaining means), a first sensor control part 17A-1, a second sensor control part 17A-2, . . . , an $n^{th}$ sensor control part 17A-n, a joint control part 19A-11, a joint control part 19A-12, a joint control part 19A-21, a joint control part 19A-22, . . . , a joint control part 19A-n1, a joint control part 19A-n2, the sensor 21-11, the sensor 21-12, the sensor 21-21, the sensor 21-22, . . . , the sensor 21-n1, the sensor 21-n2, and the communication part 23.

The robot 1A includes a power part (not shown) supplying power to each part. In the following, when the description does not intend to specify an individual sensor control part among the first sensor control part 17A-1, the second sensor control part 17A-2, . . . , the $n^{th}$ sensor control part 17A-n, the sensor control part is generally referred to as "sensor control part 17A". In addition, when the description does not intend to specify an individual joint control part among the joint control part 19A-11, the joint control part 19A-12, the joint control part 19A-21, the joint control part 19A-22, . . . , the joint control part 19A-n1, and the joint control part 19A-n2, the joint control part is generally referred to as "joint control part 19A".

The joint control part 19A obtains the touch sensation information detected by the sensor 21 at the time of gripping an object, and outputs the obtained touch sensation information to the sensor control part 17A. It is noted that the circuit configuration example of the joint control part 19A is the same as that shown in FIG. 4 of the first embodiment, for example.

The sensor control part 17A outputs the obtained touch sensation information to the robot control part 15A.

The robot control part 15A, first of all, switches the sensitivity mode based on the visual sensation information, like the first embodiment. Then, the robot control part 15A determines whether to adjust the sensitivity based on the touch sensation information at the time of actual gripping, and adjusts the sensitivity based on the result of determination.
[Example of Processing Procedures]

In the following, an example of the processing procedures of the robot 1A is described.

Figure 15:
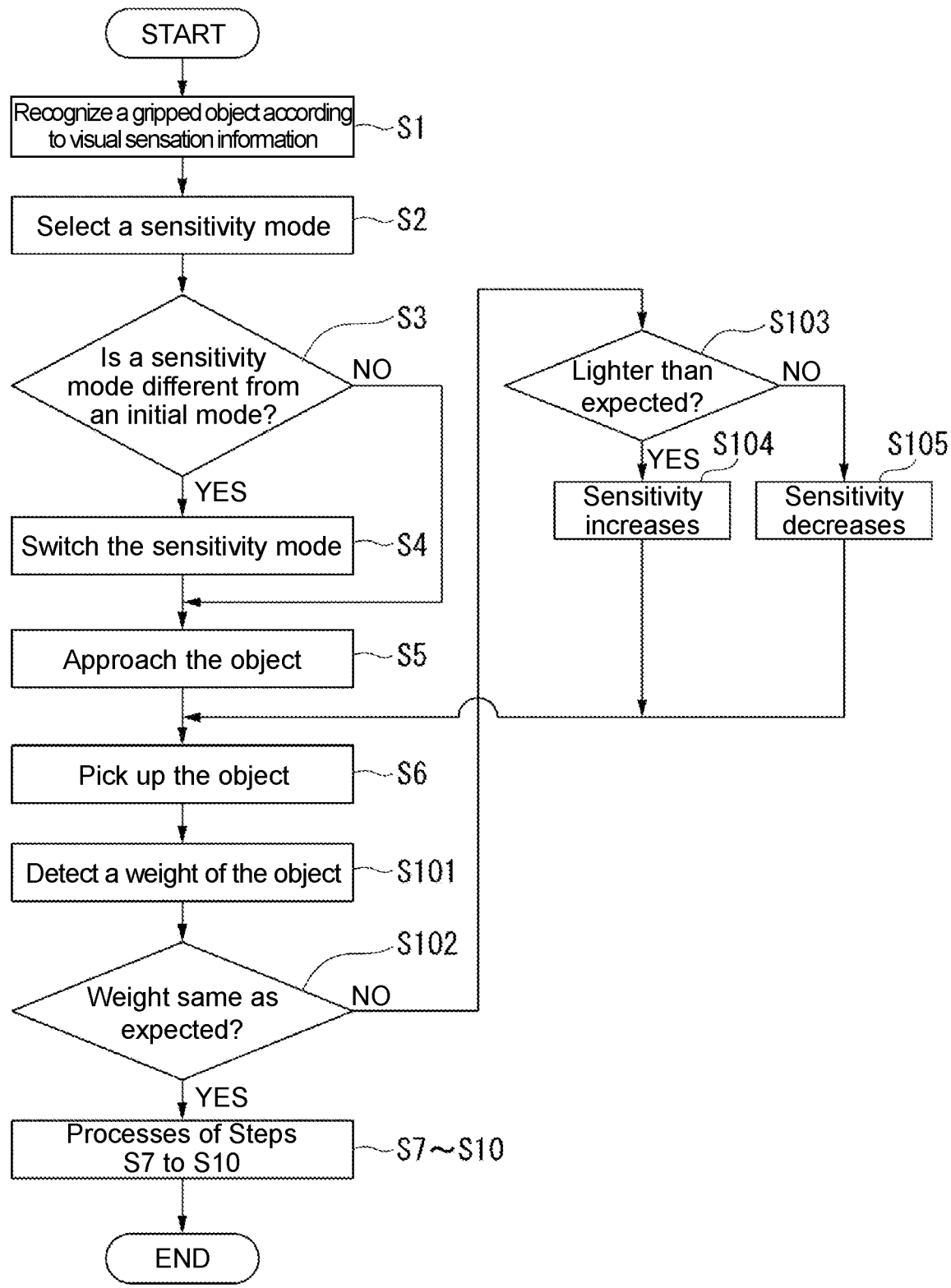
FIG. 15 is a flowchart illustrating an example of processing procedures of a robot according to the second embodiment.
Figure 16:
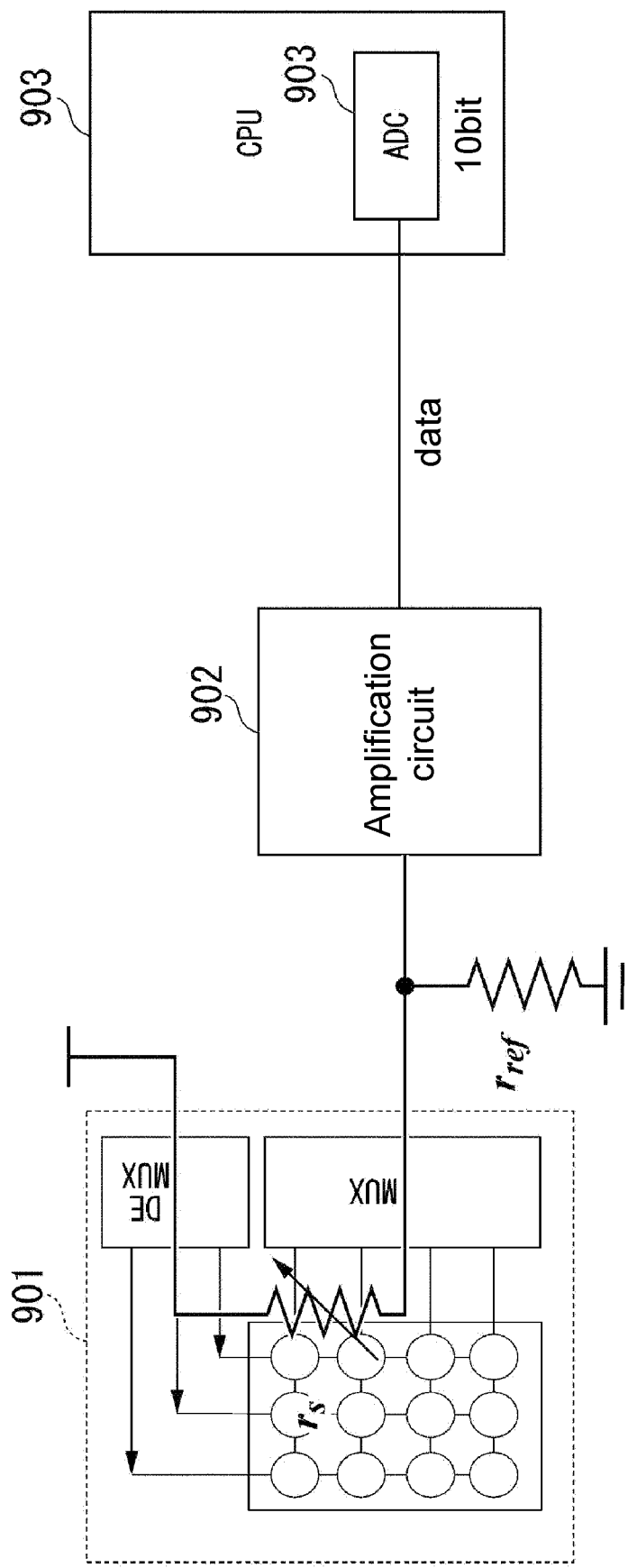
FIG. 16 is a diagram illustrating a circuit configuration example of a touch sensation system of the conventional technology.
Figure 17:
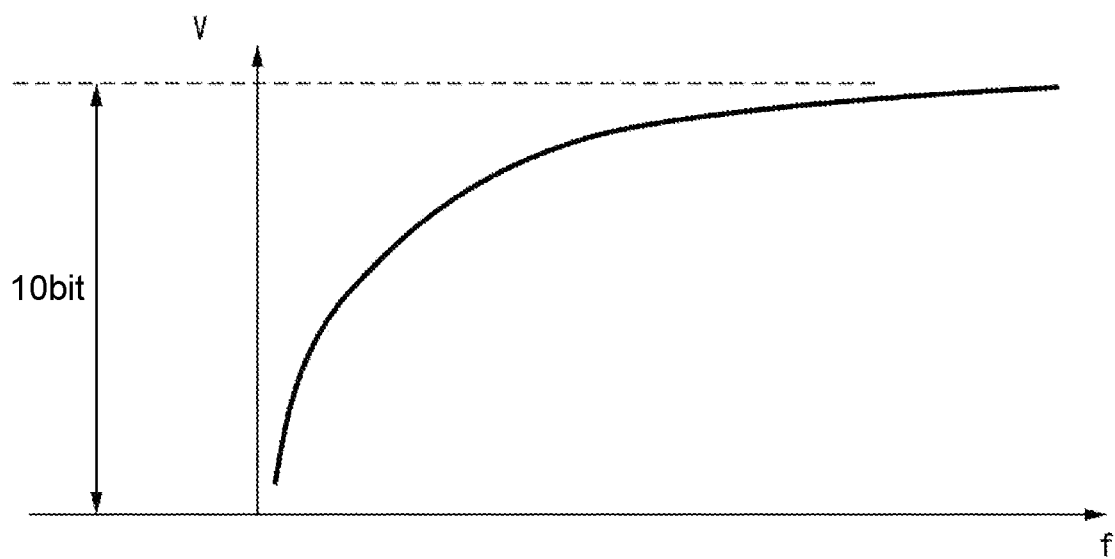
FIG. 17 is a diagram illustrating an example of a relation between a force and an input voltage value to an ADC in the conventional example.

FIG. 15 is a flowchart illustrating an example of processing procedures of the robot according to the embodiment.

(Step S1 to Step S6) The robot 1A performs Step S1 to Step S5.

(Step S101) The robot control part 15A detects the weight of the gripped object by using a conventional process based on the touch sensation information at the time of actual gripping.

(Step S102) The robot control part 15A determines whether the weight meets the weight (see FIG. 13, for example) assumed in the sensitivity mode switched based on the visual sensation information. If the robot control part 15A determines that the weight meets the assumed weight (Step S102: YES), the processes of Step S7 to Step S10 are performed. If the robot control part 15A determines that the weight does not meet the assumed weight (Step S102: NO), the flow proceeds to the process of Step S103.

(Step S103) The robot control part 15A determines whether the weight of the gripped object is lighter than the assumed weight. If the robot control part 15A determines that the weight of the gripped object is lighter than the assumed weight (Step S103: YES), the flow proceeds to the process of Step S104. If the robot control part 15A determines that the weight of the gripped object is not lighter (heavier) than the assumed weight (Step S103: NO), the flow proceeds to the process of Step S105.

(Step S104) The robot control part 15A increases the sensitivity with respect to the switched sensitivity mode. After the process, the robot control part 15A returns to the process of Step S6.

(Step S105) The robot control part 15A decreases the sensitivity with respect to the switched sensitivity mode. After the process, the robot control part 15A returns to the process of Step S6.

It is noted that the processing procedure shown in FIG. 15 is merely an example, and the invention is not limited thereto. For example, in Step S103, the robot control part 15A may also determine whether the weight is heavier than assumed. In such case, the robot control part 15A decreases the sensitivity if the weight is heavier than assumed, and increases the sensitivity if the weight is not heavier than assumed.

In addition, the robot control part 15A may also increase or decrease the sensitivity by transitioning the sensitivity mode from the mode II of FIG. 11 to the mode IV or VI. Alternatively, the robot control part 15A may also increase or decrease the sensitivity by fine-tuning the sensitivity mode, such as the sensitivity mode II of FIG. 11.

Like the first embodiment, the switching of the sensitivity mode in the embodiment is performed by gain switching and reference voltage switching. Moreover, in the embodiment as well, the force is kept constant during the period of the switching timing due to communication at the time of mode switching.

Thus, according to the embodiment, since the sensitivity mode in accordance with a contact target is set based on the visual sensation information and the touch sensation information, a more precise resolution of force in accordance with the object to be handled can be obtained, and a dexterous operation and a powerful operation can both be realized by using the same system.

It is noted that the robot according to each of the embodiments and the modified example suffices as long as the robot includes a robot hand. The robot may be a biped robot, a work robot, a reception robot, a nursing robot, etc. Also, the robot hand of the robot according to each of the embodiments and the modified example suffices as long as the robot includes two or more finger parts.

Also, although the robot according to each of the embodiments and the modified example is described with an example exerting operation control on one robot hand, the number of the robot hands may also be two or more. In such case, the robot control part 15 (or 15A) may switch the sensitivity mode of each of the robot hands based on the visual sensation information. In such case, the robot control part 15 (or 15A) may switch the sensitivity modes with respect to the first robot hand and the second robot hand to the same sensitivity mode, and may also switch the sensitivity modes with respect to the first robot hand and the second robot hand to different sensitivity modes.

Furthermore, based on the touch sensation information at actual gripping, the robot control part 15A, for example, may adjust the sensitivity modes with respect to the first robot hand and the second robot hand to be the same or different.

In addition, the robot control part 15 (or 15A) may also switch the sensitivity mode based on the touch information. In addition, the robot control part 15 (or 15A) may also adjust the sensitivity mode switched based on the touch sensation information based on the visual sensation information.

In the invention, a program for realizing the entirety or a portion of the function of the robot 1 (or 1A) may be recorded in a computer-readable recording medium, the program recorded in the recording medium is read and executed by a computer system to perform the entirety of a portion of the processes performed by the robot 1 (or 1A). Here, the "computer system" includes hardware such as the OS and peripherals, etc. Also, the "computer system" includes to a system built in on a local network, a system built on cloud, etc. In addition, the "computer-readable recording medium" refers to a storage device, such as a movable medium including a flexible disk, a magneto-optical disk, a ROM, a CD-ROM, etc., a hard disk built in the computer system, etc. Moreover, the "computer-readable recording medium" further includes a storage keeping the program for a predetermined time such as a volatile memory (RAM) inside the computer system serving as a client or a server when the program is transmitted via a network such as the Internet, etc., or a communication line such as a telephone line.

In addition, the program may also be transmitted from the computer system storing the program in a storage device, etc., to another computer system via a transmission medium or transmission waves in the transmission medium. Here, the "transmission medium" transmitting the program refers to a medium having a function of transmitting information, such as a network (communication network) like the Internet, etc., or a communication line like a telephone line, etc. The program may serve for realizing a portion of the function. In addition, the program may also be a so-called differential file (differential program) capable of being combined with a program having been recorded in the computer system to realize the function.

Although the embodiments for carrying out the invention have been described above using the embodiments, the invention is not limited to these embodiments. Various modifications and substitutions can be made without departing from the gist of the invention.

What is claimed is:

1. A touch sensation sensor, mounted to a hand part of a robot, the touch sensation sensor comprising:
    an obtaining means, obtaining at least one of visual sensation information, which is target object information relating to a target object operated by using the hand part, and touch sensation information, which is the target object information at a time when the target object operated by using the hand part is gripped, wherein the obtaining means comprises:
    an analog-digital converter, converting the target object information, which is analog data, into digital data; and
    an amplification part, changing a gain of a signal with respect to the analog data; and
    a control device, changing a sensitivity mode of the touch sensation sensor in accordance with the target object information that is obtained by dynamically changing, with respect to the analog data input to the analog-digital converter, a gain or a threshold of the amplification part at a time when the robot operates.

2. The touch sensation sensor as claimed in claim 1, wherein the control device detects a weight of the target object based on the touch sensation information, compares the weight that is detected with an object weight that is assumed under the sensitivity mode that is switched, and changes the sensitivity mode based on a result of comparison.

3. The touch sensation sensor as claimed in claim 1, wherein the control device keeps a force before switching starts during a switching period of the sensitivity mode, and, after the switching period of the sensitivity mode, switches to a force calculated by using a force conversion formula after switching to the sensitivity mode.

4. A sensitivity switching circuit, comprising:
    a comparative amplification circuit, comparing and amplifying a voltage value output by a touch sensation sensor mounted to a hand part of a robot with a reference voltage value;

a variable resistance, wherein a gain of the comparative amplification circuit is variable in accordance with an instruction for switching a sensitivity mode of the touch sensation sensor;

a reference voltage variable resistance, wherein a voltage value output by the touch sensation sensor is variable in accordance with the instruction for switching the sensitivity mode of the touch sensation sensor; and an analog-digital converter, converting an analog value output by the comparative amplification circuit into a digital value.

5. A sensitivity switching method for a touch sensation sensor mounted to a hand part of a robot, the sensitivity switching method comprising:

obtaining, by an obtaining means, at least one of visual sensation information, which is target object information relating to a target object operated by using the hand part, and touch sensation information, which is the target object information at a time when the target object operated by using the hand part is gripped;

converting, by an analog-digital converter of the obtaining means, the target object information, which is analog data, into digital data;

changing, by an amplification part of the obtaining means, a gain of a signal with respect to the analog data; and changing, by a control device, a sensitivity mode of the touch sensation sensor in accordance with the target object information that is obtained by dynamically changing, with respect to the analog data input to the analog-digital converter, a gain or a threshold of the amplification part at a time when the robot operates.

6. The touch sensation sensor as claimed in claim 2, wherein the control device keeps a force before switching starts during a switching period of the sensitivity mode, and, after the switching period of the sensitivity mode, switches to a force calculated by using a force conversion formula after switching to the sensitivity mode.

* * * * *